Patented May 24, 1949

2,471,396

UNITED STATES PATENT OFFICE 2,471,396

AQUEOUS EMULSIONS OF MIXED PHTHALIC GLYCERIDE AND MELAMINE-FORMALDEHYDE RESINS

Donald W. Light, Longmeadow, Mass., assignor to American Cyanamid Company, New York, N. Y., a corporation of Maine No Drawing. Application January 1, 1943, Serial No. 471,026

6 Claims. (Cl. 260—7.5)

This invention relates to dispersions containing melamine-formaldehyde resins which are of particular value in the finishing of textiles and leather, the coating of paper and other objects, the preparation of water inks, paints, enamels and printing compositions, and in other arts wherein aqueous resin dispersions have found utility.

Stable aqueous dispersions of melamine-formaldehyde resins are exceedingly difficult to prepare with conventional emulsifying agents and techniques. Dispersions with aqueous media have been accomplished but such dispersions are generally characterized by lack of uniformity, large average particle size, tendency of the aqueous phase to separate out, poor water resistance of the resin film when applied to articles, and other undesirable qualities. More satisfactory dispersions of these synthetic resins have been prepared with special emulsifying agents and special techniques. These methods, however, involve generally the use of substantial quantities of non-resinous materials which necessarily modify the character of the resin composition and its films. In many cases it has been necessary to resort to the use of slow and cumbersome colloid mills and homogenizers to obtain usable dispersions.

I have now found that it is possible to prepare stable emulsions of melamine-formaldehyde resins which are characterized by an extremely small and uniform particle size, ordinarily less than 1 micron in diameter, in a very convenient and simple manner by using compositions which contain high acid number alkyd resins together with the melamine resin to be dispersed.

In carrying out my method I mix with the melamine-formaldehyde resin to be emulsified a quantity of an alkyd resin having an acid number of about 25 or more. If the resin mixture is of such viscosity that it cannot be readily stirred it may be liquified with an appropriate solvent. I then stir into the liquid resin mixture an aqueous solution of an emulsifying agent. As the emulsifying agent is slowly added to the resin mixture an emulsion of the water-in-oil type is first obtained but upon continued addition of the emulsifying solution the emulsion inverts to the oil-in-water type. The emulsion is found to consist of very small and uniform particles of the resin mixture dispersed throughout the aqueous medium. The emulsion may be further diluted with water to the concentration desired for storage or use. It has been found that emulsions prepared in this manner remain stable for periods of many months. In some cases a slight separation of the aqueous phase may occur but upon shaking the emulsion is easily brought together again.

The action of high acid number alkyd resins in promoting fine dispersions and in stabilizing the melamine-formaldehyde resin emulsions is obscure. I have found that those alkyd resins having an acid number of about 25 or more exert definite stabilizing and emulsifying effects upon the resin dispersion. The stabilizing effect is most pronounced in those resins which have an acid number of about 60. However, mixtures of alkyd resins having acid numbers within the range 26 to 34 with other synthetic resins have also been found to give emulsions having the improved qualities characteristic of my invention. Emulsions prepared in an identical manner but with no high acid number alkyd resin present were found to be composed of large particles of widely ranging size and were unstable upon standing. Accordingly, when I speak of high acid number alkyd resin I intend to include, for purposes of this invention, those alkyd resins having an acid number of about 25 or more prepared from polybasic acids and polyhydroxy alcohols, preferably phthalic anhydride and glycerol, with or without minor proportions of modifying oils and fatty acids.

By using a high acid alkyd resin to promote the emulsification I am able to obtain a resin emulsion composed almost entirely of resinous materials which, when applied to textiles, paper, leather and other objects and dried, gives a film of a substantially unmodified resinous nature. I have also found that the high acid alkyd resins when emulsified with melamine-formaldehyde resins act somewhat as a curing catalyst making it possible to cure the melamine resin to a water insoluble condition in a much shorter period of time. I have also found that high acid alkyd resins have a plasticizing effect upon melamine resins. This is particularly important inasmuch as melamine resins naturally tend to be brittle and in the treatment of textile fabrics especially, the high acid alkyd resins aid materially in developing a full, springy hand.

The amount of high acid alkyd resin used in my dispersions may vary considerably. Appreciable improvement in the dispersions have been noticed when as little as 5% of the high acid number alkyd resin, based on the total resin content, is employed. Ordinarily it is not necessary to use more than about 50% of high acid alkyd resin based on the total resin content in order to secure the required degree of fineness and stability in my emulsions. However, when it is desired to take greater advantage of the curing action of high acid alkyd resins and/or the plasticizing action of alkyd resins generally on the melamine resins it is permissible to use as much as 60% of alkyd resin in the emulsion. Excessive amounts of alkyd resins may impart to the resin film characteristics of those resins and since my improved resin emulsions are intended to be emulsions of melamine resins having their many desirable characteristics the amount of melamine resin in the composition should ordinarily predominate. In determining the amount of melamine or alkyd resins in the mixture it will be understood, of course, that such constituents as solvents, plasticizers, oils, unreacted fatty acids, glycerol, etc., which are not resinous in nature are not to be considered as resinous constituents of the emulsions.

By melamine-formaldehyde resin I mean those condensation and/or polymerization products of melamine and formaldehyde in which one mol of melamine is reacted with from 2 to 6 mols of formaldehyde in aqueous media or in organic solvents. I also intend to include those melamine resins known as alkylated methylol melamines which are prepared by heating melamine and formaldehyde, or a methylol melamine, with a primary monohydric alcohol such as ethanol, propanol, butanol, etc. in the presence of an acidic condensing agent such as phosphoric acid.

As emulsifying agent for use in conjunction with the high acid number alkyd resin in preparing aqueous dispersions of melamine-formaldehyde resins I greatly prefer the use of ammonium caseinate although other alkali caseinates such as morpholine caseinate, sodium caseinate, diethanolamine caseinate, triethanolamine caseinate, etc., may be used with good results. I have also used other emulsifying agents of the protein type with fairly good results. Emulsions prepared with non-proteinaceous emulsifying agents have prematurely broken, have gelled upon standing and their dried films, particularly when soaps have been used, have had a reduced water resistance. Since one of the principal advantages of my new emulsion is the permanency of the finish it gives as a textile finishing agent the importance of using an emulsifying agent permitting the preparation of a product having high water resistance is obvious. The ammonium caseinate is ordinarily employed by me as an aqueous solution containing about 2 to 10% of casein dissolved therein and is prepared by simply soaking casein in water at room temperature for about one-half hour, then heating to about 45° C. and stirring in the necessary amount of ammonia to dissolve the casein. Other alkali caseinates are prepared in a similar manner.

Because of the improved stability of my resin emulsions, pigments such as lithopone or titanium dioxide may be readily incorporated. Driers, such as cobalt linoleates, preservatives, such as sodium pentachlorophenolate, and materials to improve the consistency of the emulsion, such as zinc stearate and gums, may also be added if desired. Several different types and kinds of dyes and pigments have been mixed with my improved emulsions and the product has remained stable for many months.

While I prefer to add the aqueous solution of emulsifying agent to the liquid resin until inversion of phase occurs and an oil-in-water type emulsion is obtained, it is not necessary that the inversion take place. I may, if desired, discontinue the addition of water and emulsifying agent to the resin before inversion occurs and thereby obtain a dispersion of the water-in-oil type which may be readily dispersed in water at some later time. In such cases, however, the amount of emulsifying agent added should be sufficient to emulsify the resinous components. It is also possible to pour the liquid resin into the aqueous solution of emulsifying agent with agitation, to obtain an emulsion. This latter method usually gives emulsons of distinctly larger particle size and of less stability than my preferred method as disclosed in the specific examples.

My invention will now be described in connection with the following specific examples which are given for purposes of illustration only.

Example 1

45 parts by weight of a solution containing 9 parts by weight of toluene and 36 parts by weight of a cottonseed oil modified alkyd resin containing 72% of phthalic glyceride (calculated) and having an acid number in the range of 60 to 80 was mixed with a solution containing 108 parts by weight of a solution containing 18.5 parts by weight of butanol and 89.5 parts by weight of a castor oil modified alkyd resin containing 50% phthalic glyceride (calculated) and having an acid number of 6.8. The foregoing mixture of alkyd resins had an acid number of about 29. To this mixture of alkyd resins was added 181 parts by weight of a 50% solution in a mixed 60% butanol-40% xylol solvent of a butylated methylol melamine resin prepared from 5 molecular equivalents of formaldehyde and one molecular equivalent of melamine, the resin being approximately 30% butylated. The resin solutions were thoroughly mixed and at room temperature an aqueous solution of ammonium caseinate prepared from 289 parts by weight of water, 26 parts by weight of casein and 18 parts by weight of 26° Bé. ammonia was then slowly poured into the resin solution while stirring vigorously with a propeller type agitator. A water-in-oil emulsion was first formed but when most of the ammonium caseinate solution had been added it inverted to an emulsion of the oil-in-water type having a uniform particle size of less than one micron. The emulsion was then diluted further with 333 parts by weight of water. This emulsion remained stable over a period of several months.

The permanency of this composition as a textile finishing agent was demonstrated by treating a sample of spun rayon cloth with the emulsion diluted to 6% solids with water. After impregnating the cloth so that it took up 4% of resin solids it was dried for 5 minutes at 240° F. Another sample of the same cloth was dried 5 minutes at 240° F. and then cured for 4 minutes at 284° F. Both samples had a full, springy and otherwise desirable hand. They were then washed for 4 hours in a 0.25% soap solution at 160° F., rinsed and dried. Despite this severe washing treatment the sample which had been dried for 5 minutes at 240° F. retained 84.2% of the resin finish and the sample that had been dried and cured retained 92.1% of the resin finish.

Example 2

An emulsion was prepared exactly as described in the preceding example with the exception that the proportion of high acid number alkyd resin was cut in half. This emulsion was also found to contain uniformly fine particles having a size of the order of one micron. This emulsion was stable for several months without showing signs of breaking.

*Example 3*

Another emulsion was prepared exactly as described in Example 2 but with the exception that the low acid number alkyd resin was replaced with an equal amount of a benzoic acid modified alkyd resin containing about 60% phthalic glyceride (calculated) and having an acid number within the range of 22 to 27. This emulsion was also found to contain uniformly small resinous particles of the order of one micron in diameter. It was extremely stable upon storing and could be diluted with water to a consistency suitable for use in impregnating textile fabrics without breaking.

This is a continuation-in-part of my copending application, Serial No. 369,986, filed December 13, 1940, and now abandoned.

I claim:

1. A method of preparing a stable aqueous synthetic resin emulsion of the oil-in-water type which comprises preparing a liquid mixture comprising 5-60% of phthalic glyceride resin having an acid number of at least 25 and 95-40% of the reaction product of methylol melamine with a primary monohydric alcohol in the presence of an acidic condensing agent, and agitating said mixture with an aqueous solution containing at least 2% of a proteinaceous emulsifying agent until an emulsion of the oil-in-water type is produced.

2. A method of preparing a stable aqueous synthetic resin emulsion of the oil-in-water type which comprises preparing a liquid mixture containing 5-60% of a mixture of two phthalic glyceride resins, one having an acid number of at least 25 and the other having an acid number substantially below 25, said mixture having an acid number of at least 25, and 95-40% of the reaction product of methylol melamine with a primary monohydric alcohol in the presence of an acidic condensing agent, and agitating said mixture with an aqueous solution containing at least 2% of a proteinaceous emulsifying agent until an emulsion of the oil-in-water type is produced.

3. A method of preparing a stable aqueous synthetic resin emulsion of the oil-in-water type which comprises preparing a liquid mixture comprising 5-60% of phthalic glyceride resin having an acid number of at least 25 and 95-40% of the reaction product of methylol melamine with a primary monohydric alcohol in the presence of an acidic condensing agent, and agitating said mixture with an aqueous solution containing at least 2% of alkali caseinate until an emulsion of the oil-in-water type is produced.

4. A stable emulsion of the oil-in-water type wherein the dispersed phase is a liquid mixture containing 5-60% of phthalic glyceride resin having an acid number of at least 25 and 95-40% of of the reaction product of methylol melamine with a primary monohydric alcohol in the presence of an acidic condensing agent and the continuous phase is an aqueous solution containing sufficient proteinaceous emulsifying agent to produce an emulsion capable of dilution with water without breaking, said emulsion being characterized by its fine particle size and stability on standing.

5. A stable emulsion of the oil-in-water type wherein the dispersed phase is a liquid mixture containing 5-60% of a mixture of two phthalic glyceride resins, one having an acid number of at least 25 and the other having an acid number substantially below 25, said mixture having an acid number of at least 25, together with 95-40% of a reaction product of methylol melamine with a primary monohydric alcohol in the presence of an acidic condensing agent, and the continuous phase is an aqueous solution containing sufficient proteinaceous emulsifying agent to produce an emulsion capable of dilution with water without breaking, said emulsion being characterized by its fine particle size and stability on standing.

6. A stable emulsion of the oil-in-water type wherein the dispersed phase is a liquid mixture containing 5-60% of a mixture of two phthalic glyceride resins, one having an acid number of at least 25 and the other having an acid number substantially below 25, said mixture having an acid number of at least 25, together with 95-40% of a butylated melamine-formaldehyde resin, and the continuous phase is an aqueous solution containing sufficient proteinaceous emulsifying agent to produce an emulsion capable of dilution with water without breaking, said emulsion being characterized by its fine particle size and stability on standing.

DONALD W. LIGHT.

REFERENCES CITED

The following references are of record in the file of this patent:

UNITED STATES PATENTS

| Number | Name | Date |
| --- | --- | --- |
| 2,218,474 | Moore | Oct. 15, 1940 |
| 2,248,696 | Cassel | July 8, 1941 |
| 2,293,164 | Myers | Aug. 18, 1942 |
| 2,317,371 | Gessler et al. | Apr. 27, 1943 |
| 2,361,277 | Enderlin et al. | Oct. 24, 1944 |
| 2,364,692 | Cassel | Dec. 12, 1944 |

FOREIGN PATENTS

| Number | Country | Date |
| --- | --- | --- |
| 349,464 | Great Britain | May 26, 1931 |